United States Patent
Choi (10) Patent No.: US 10,499,211 B2
(45) Date of Patent: Dec. 3, 2019

(54) METHODS FOR IDENTIFYING CONTACT BETWEEN TERMINALS, AND COMPUTER PROGRAM AND APPLICATION THEREFOR

(71) Applicant: DINGUL CO. LTD., Seoul (KR)

(72) Inventor: Seung Wook Choi, Seoul (KR)

(73) Assignee: DINGUL CO. LTD., Seoul (KR)

( * ) Notice: Subject to any disclaimer, the term of this patent is extended or adjusted under 35 U.S.C. 154(b) by 0 days.

(21) Appl. No.: 16/226,735

(22) Filed: Dec. 20, 2018

(65) Prior Publication Data

US 2019/0124485 A1 Apr. 25, 2019

Related U.S. Application Data

(62) Division of application No. 15/554,671, filed as application No. PCT/KR2016/002252 on Mar. 7, 2016, now Pat. No. 10,165,421.

(30) Foreign Application Priority Data

Mar. 10, 2015 (KR) ........................ 10-2015-0033272

(51) Int. Cl.
*H04W 4/21* (2018.01)
*H04W 4/80* (2018.01)
(Continued)

(52) U.S. Cl.
CPC .......... *H04W 4/21* (2018.02); *G06Q 30/0225* (2013.01); *G06Q 30/0239* (2013.01);
(Continued)

(58) Field of Classification Search
CPC .............. A61B 5/062; A61B 2034/107; A61B 1/00158; A61B 5/061; A61B 34/37;
(Continued)

(56) References Cited

U.S. PATENT DOCUMENTS 9,801,222 B1 * 10/2017 Pezdirc ................. H04W 4/025
2010/0278345 A1   11/2010 Alsina et al.
(Continued)

FOREIGN PATENT DOCUMENTS

JP       2013-232895 A    11/2013
KR       10-1085117 B1    11/2011
(Continued)

*Primary Examiner* — Nimesh Patel
(74) *Attorney, Agent, or Firm* — Novick, Kim & Lee, PLLC; Sang Ho Lee (57) ABSTRACT

Provided are a method of identifying contact between terminals, and a computer program and an application for executing the method. The method for identifying contact between terminals according to this invention includes the server receiving from a first terminal a first state information data of a first terminal based on information about an external magnetic force of the first terminal generated by a first terminal; receiving, by the server, second state information data of the second terminal based on the information about the external magnetic force of the second terminal generated in the second terminal from the second terminal; determining whether a difference between a time when the first state information data is generated and a time when the second state information data is generated is within a preset time; and the step of transmitting a message to at least one of the first terminal and the second terminal according to the determination by the server.

7 Claims, 8 Drawing Sheets

(51) Int. Cl.
*G06Q 30/02* (2012.01)
*H04W 4/02* (2018.01)
*H04W 56/00* (2009.01)
*H04B 5/00* (2006.01)
*H04W 4/00* (2018.01)
*H04W 8/24* (2009.01)

(52) U.S. Cl.
CPC ............ *H04B 5/0031* (2013.01); *H04W 4/00* (2013.01); *H04W 4/023* (2013.01); *H04W 4/026* (2013.01); *H04W 4/80* (2018.02); *H04W 56/0025* (2013.01); *H04W 8/24* (2013.01)

(58) Field of Classification Search
CPC ... A61B 5/06; A61B 1/00009; A61B 1/00016; A61B 5/7425; A61B 8/0841; H04M 1/0245; H04M 1/72569; H04M 2250/10; H04M 2250/12; H04M 1/72572; H04M 1/72577; H04M 1/0202; H04M 1/0266; H04M 1/72522; H04M 3/5116; H04W 24/10; H04W 4/02; H04W 4/046; H04W 4/80; H04W 84/005; H04W 88/02; H04W 8/005; H04W 4/025; H04W 12/06; H04W 84/14; H04W 52/0254; H04W 52/027; H04W 64/003; H04W 72/04; H04W 84/12; H04W 88/06; H04W 4/021; H04W 4/026; H04W 4/027; H04W 4/043; H04W 76/14; H04W 64/00; H04W 88/16; H04W 4/023; H04W 56/0045; H04W 8/24; H04W 4/029; H04W 64/006; H04W 76/10; H04W 56/006; H04W 56/0085; G06T 7/0012; G06T 19/20; G06T 2207/10016; G06T 2219/2021; G06T 7/149; G06T 7/33; G06T 7/75; A61M 2025/0166; A61M 25/0067; A61M 25/01; A61M 25/0127; H04L 67/34; H04L 12/2803; H04L 12/2809; H04L 2012/2841; H04L 2012/285; H04L 65/604; H04L 67/20; H04L 5/0053; H04L 5/0091; G01S 5/10; G01S 5/0236; G01S 5/021; G01S 5/0252; G01S 5/0242; G01S 5/12; G01S 5/0027; G01S 5/0263; G01S 5/06

See application file for complete search history.

(56) References Cited

U.S. PATENT DOCUMENTS

| | | |
|---|---|---|
| 2011/0070828 A1 | 3/2011 | Griffin et al. |
| 2011/0154014 A1 | 6/2011 | Thorn |
| 2011/0187505 A1 | 8/2011 | Faith et al. |
| 2013/0150076 A1* | 6/2013 | Kim ............... H04W 24/00 455/456.1 |
| 2014/0206288 A1 | 7/2014 | Liu et al. |
| 2015/0215770 A1 | 7/2015 | Chan et al. |
| 2016/0232677 A1 | 8/2016 | Liao et al. |
| 2016/0261134 A1* | 9/2016 | Wu ................... H02J 50/12 |

FOREIGN PATENT DOCUMENTS

| | | |
|---|---|---|
| KR | 10-2012-0066051 A | 6/2012 |
| KR | 10-2012-0078792 A | 7/2012 |
| KR | 10-2014-0073075 A | 6/2014 |
| KR | 10-2014-0135569 A | 11/2014 |

* cited by examiner

METHODS FOR IDENTIFYING CONTACT BETWEEN TERMINALS, AND COMPUTER PROGRAM AND APPLICATION THEREFOR

CROSS-REFERENCE TO RELATED APPLICATIONS

The instant application is a divisional application of U.S. patent application Ser. No. 15/554,671 filed Aug. 30, 2017, which is a national-stage entry under 35 U.S.C. § 371 of international application No. PCT/KR2016/002252 filed on Mar. 7, 2016, and claims priority to Korean patent application No. 10-2015-0033272 filed on Mar. 10, 2015, the entire disclosures of which are hereby incorporated by reference.

TECHNICAL FIELD

This invention relates to a method of identifying contact or proximity between terminals and a computer program and an application for executing steps of the method.

TECHNOLOGY AS THE BACKGROUND OF THE INVENTION

Mobile communication systems are continuously gaining popularity and are becoming an integral part of personal and business communications. A mobile device allows a typical user to access the Internet via a cellular network or a wireless local area network (WLAN). For example, some mobile devices have a contactless Near Field Communication (NFC) chip. The NFC technology is typically used for contactless short distance communication based on the radio frequency identification (RFID) standards using magnetic field induction to enable communication between mobile wireless communication devices. These short-distance communications are used for payment, ticketing, electronic key, device setup, coupon publishing, and sharing of media data information such as music or video. This short-distance high-frequency wireless communication technology exchanges data between devices over a short distance, such as only a few centimeters. As such, the NFC technology is becoming a common technology, but there is a limitation that both mobile devices can communicate with each other even if two or more mobile devices under communication provide the NFC technology. For example, if one of the mobile devices of a certain company has an NFC chip, while another smartphone is not equipped with an NFC chip, the smartphone and the smartwatch cannot communicate in proximity.

The background technology of this invention is disclosed in the Korean Patent Official Register No. 10-2012-0066051 (Jun. 21, 2012). The background technology is also applied under the premise that both devices are provided with an NFC chip.

For various reasons in addition to limitations such as the presence or absence of NFC chips in the device, both devices may not communicate in proximity with each other. That is, there are cases where both terminals do not recognize that they are in proximity to or in contact with each other.

CONTENTS OF THE INVENTION

Problem to Solve

The purpose of this invention to provide a method for identifying contact between terminals.

It is also the purpose of this invention to provide a computer program and a terminal application for executing the steps included in a method for identifying contact between terminals.

Means for the Solution

According to an aspect of this invention, there is provided a method for a terminal, comprising: receiving, by the server, first state information data of a first terminal based on information about an external magnetic force of the first terminal generated in a first terminal; receiving, by the server, second state information data of the second terminal based on the information about the external magnetic force of the second terminal generated in the second terminal from the second terminal; and identifying whether a difference between a time at which the first state information data is generated and a time at which the server generates the second state information data is within a preset time.

According to another aspect of this invention, there is provided a method of controlling a terminal, comprising: receiving, by the server, first state information data of a first terminal based on information about an external magnetic force of the first terminal generated in a first terminal; receiving, by the server, second state information data of the second terminal based on the information about the external magnetic force of the second terminal generated in the second terminal from the second terminal; and identifying whether a difference between a time at which the server receives the first status information data and a time at which the second status information data is received is within a preset time.

According to another aspect of this invention, there is provided a method of measuring an external magnetic field, comprising: measuring an external magnetic force of a first terminal; inducing the first terminal to measure the orientation of the first terminal, and outputting the external magnetic force information output by the first terminal to measure the external magnetic force; the first terminal measuring an orientation of the first terminal; generating state information data of the first terminal including the external magnetic force and the orientation based on the measured first terminal; transmitting the status information data generated by the first terminal to a server; and receiving a message from the server confirming the contact between the first terminal and the second terminal, wherein the first terminal confirms the contact between the first terminal and the second terminal. It is apparent that the induction can be replaced with the expression of control.

According to another aspect of this invention, there is provided a method of measuring an external magnetic field, comprising: measuring an external magnetic force of a first terminal; inducing the first terminal to measure the position of the first terminal by the external magnetic force information outputted by the step of measuring the external magnetic force by the first terminal; the first terminal measuring a position of the first terminal; generating state information data of the first terminal including the external magnetic force and the position based on the measured first terminal; transmitting the status information data generated by the first terminal to a server; and receiving a message from the server confirming the contact between the first terminal and the second terminal, wherein the first terminal confirms the contact between the first terminal and the second terminal.

According to another aspect of this invention, a first terminal measures an external magnetic force of the first terminal and an orientation of the first terminal, and the state information of the first terminal including the external magnetic force and the orientation-based data; transmitting the status information data generated by the first terminal to a server; and receiving a message from the server confirming the contact between the first terminal and the second terminal, wherein the first terminal confirms the contact between the first terminal and the second terminal.

According to another aspect of this invention, there is provided a method for the first terminal measuring an external magnetic force of the first terminal and a position of the first terminal, generating a state information data of the first terminal; transmitting the status information data generated by the first terminal to a server; and receiving a message from the server confirming the contact between the first terminal and the second terminal, wherein the first terminal confirms the contact between the first terminal and the second terminal.

Also, the first state information data may further include information on an orientation of the first terminal and the second state information data may further include information on an orientation of the second terminal. The determining of the server may further include determining whether the similarity between the orientation of the first terminal and the orientation of the second terminal is equal to or greater than a reference value.

Also, the first state information data may further include information on the position of the first terminal, and the second state information data may further include information on the position of the second terminal. The server may further include determining whether a degree of similarity between a position of the first terminal and a position of the second terminal is equal to or greater than a reference value.

Also, the step of the server receiving the first state information data may further include the step of the server identifying a first parameter for identifying the first terminal from the first terminal and the second terminal for contacting the first terminal wherein the step of the server receiving the second state information data further comprises a step of the server receiving a third parameter identifying the second terminal from the second terminal and a third parameter identifying the second terminal, and receiving a fourth parameter identifying the first terminal in contact with the first terminal.

Also, the step of the determining server may further include comparing the first parameter with the fourth parameter, and comparing the second parameter with the third parameter. Also, the clocks of the first terminal and the second terminal may be synchronized. Also, the server may further include a step of transmitting the message to one or more of the first terminal and the second terminal according to the determination by the server. Also, one or more of the messages may include a payload.

Wherein the step of controlling the first terminal to measure the orientation of the first terminal measures the external magnetic force information measured by the first terminal measuring the external magnetic force, wherein the step of measuring the orientation of the first terminal by the first terminal further comprises the step of measuring the vibration of the external terminal by the first terminal, wherein the information data may further include acceleration information based on the vibration of the external terminal measured by the measured first terminal.

Also, the step of controlling the external magnetic force information measured by the first terminal to measure the external magnetic force so that the first terminal measures the position of the first terminal comprises the steps of: wherein the step of measuring the position of the first terminal by the first terminal further comprises the step of measuring the vibration of the external terminal by the first terminal, wherein the state information data of the external terminal may further include acceleration information based on the measured vibration of the external terminal measured by the first terminal.

Also, the step of controlling the vibration means provided in the first terminal to vibrate may include a control to have an identifiable vibration pattern for identifying the first terminal. Also, the server may further include a step of transmitting the message to one or more of the first terminal and the second terminal according to the determination by the server. Also, the step of generating state information data by the first terminal may further include the step of, when the variation per unit time of the external magnetic force of the first terminal measured by the first terminal is greater than a preset value, the first terminal can generate the state information data.

Also, the first terminal generates state information data by generating a first parameter that identifies the first terminal and a second parameter that identifies a second terminal that contacts the first terminal, wherein the step of the first terminal transmitting the status information data to the server further comprises transmitting the first parameter and the second parameter generated by the first terminal to the server.

Also, the step of inducing the first terminal to measure the orientation or the position of the first terminal may include the step of measuring the external magnetic force information output by the first terminal by measuring the external magnetic force, wherein the first terminal may guide the first terminal to measure the orientation of the first terminal when the variation of the external magnetic force of the first terminal per unit time is greater than a preset value or when the external magnetic force is greater than a predetermined value.

Also, according to another aspect of this invention, there is provided an application for executing the above steps in a computer program, a smartphone, a mobile device, and an Internet of Things device for executing the program on a computer.

Effect of the Invention

According to this invention, a method for identifying contact between terminals can be provided.

According to this invention, a computer program and a terminal application for executing the steps included in the method for identifying contact between terminals can be provided.

BRIEF DESCRIPTION OF DRAWINGS

Drawing 1 is a diagram illustrating a communication connection relationship between a server and a terminal according to this invention.

Drawing 2 is a flow diagram illustrating a method according to this invention from a server's perspective.

Drawing 3 is a flow chart illustrating a method according to this invention from a terminal's perspective; Drawing 4 is a view showing contact between terminals according to this invention.

Drawing 5 is a view showing an example of using the location information of a terminal.

Drawing 6 is a diagram illustrating an operation between a smartphone application, an API server, and a service server using an API server to which this invention is applied.

Drawing 7 is a diagram illustrating an application operation process of a smartphone for issuing a coupon to which this invention is applied.

Drawing 8 is a diagram showing smartwatches installed with applications to which this invention is applied.

SPECIFIC DETAILS FOR CONDUCTING THE INVENTION

This invention is capable of various modifications and embodiments, and particular embodiments are illustrated in the drawings and will be described in detail in the detailed description. It should be understood, however, that this invention is not intended to be limited to the particular embodiments, but includes all modifications, equivalents, and alternatives falling within the idea of this invention. If detailed description on the relevant technology would make the substance of this invention vague, the detailed description will be omitted.

The terms first, second, etc., may be used to describe various elements, but the elements should not be limited by the terms. The terms are used only for the purpose of distinguishing one component from another.

The terminology used herein is for the sole purpose of describing particular embodiments only and is not intended to limit the invention. The singular forms "a," "an," and "the" include plural referents unless the context clearly dictates otherwise. In this application, the terms "comprises" or "having" and the like are used to specify that there is a stated feature, number, step, operation, element, part or combination thereof, and does not preclude the presence or addition of one or more other features, integers, steps, operations, elements, components, or combinations thereof.

Hereinafter, embodiments of this invention will be described in detail with reference to the accompanying drawings. Referring to the accompanying drawings, the same or corresponding components are denoted by the same reference numerals, and repetitive description will be omitted.

Also, it is to be understood that the terms first, second, etc., used below are merely to identify the same or corresponding components, and that the same or corresponding components are not limited by terms such as first, second, etc.

Also, the term coupled is used not only to mean in the case of direct physical contact between the respective constituent elements in the contact relation between the constituent elements, but also used to mean a concept under which other constituent elements are interposed between the constituent elements.

Figure 1:
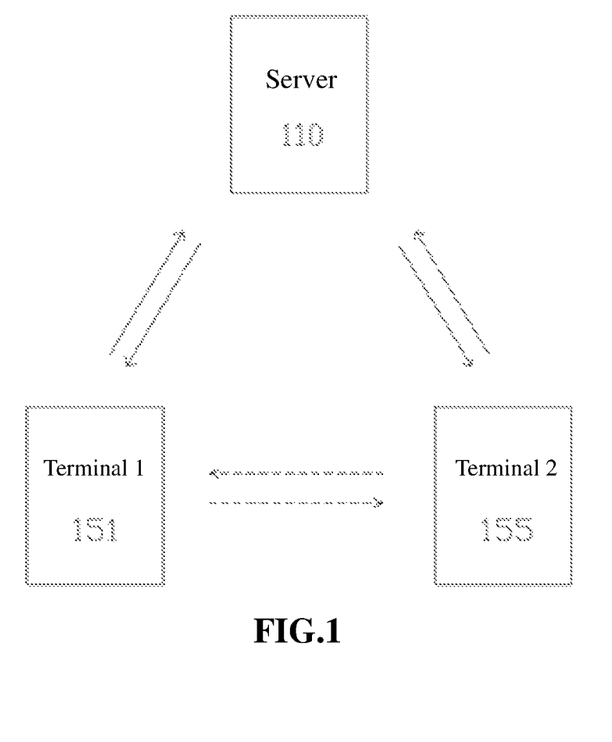

Drawing 1 is a diagram illustrating a communication connection relationship between a server and a terminal according to this invention.

Figure 2:
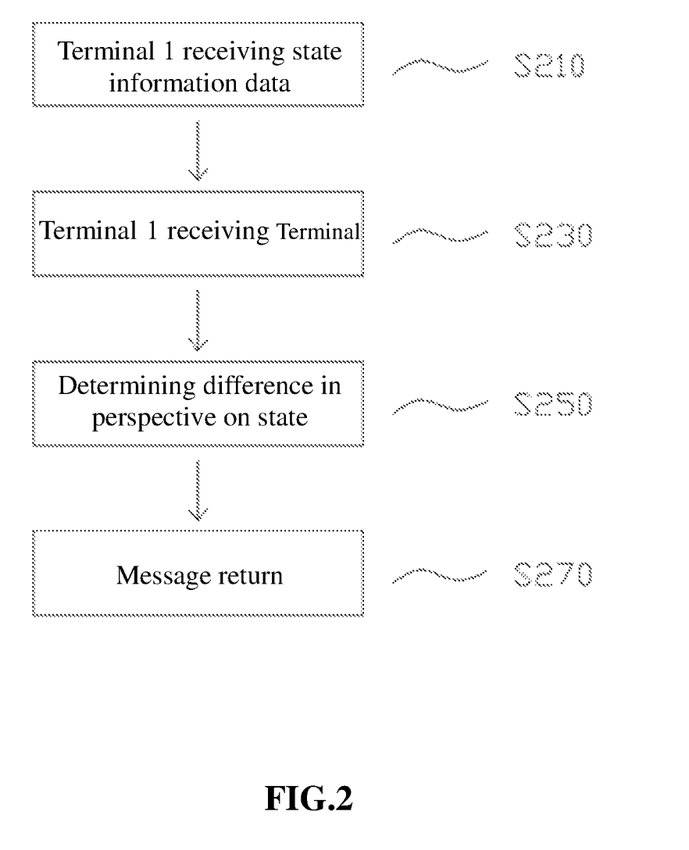

Drawing 2 is a flow chart illustrating a method according to this invention from a server perspective. Referring to Drawing 2, the server receives (S210) first state information data of a first terminal based on information about an external magnetic force of the first terminal generated in the first terminal, from the first terminal; the server receiving (S230) second state information data of the second terminal based on the information about the external magnetic force of the second terminal generated in the second terminal from the second terminal; determining whether a difference between a time at which the first state information data is generated and a time at which the server generates the second state information data is within a preset time (S250); and the server transmits a message to at least one of the first terminal and the second terminal according to the determination by the server (S270). The steps S210 and S230 need not be sequential but may be changed or performed simultaneously.

Figure 3:
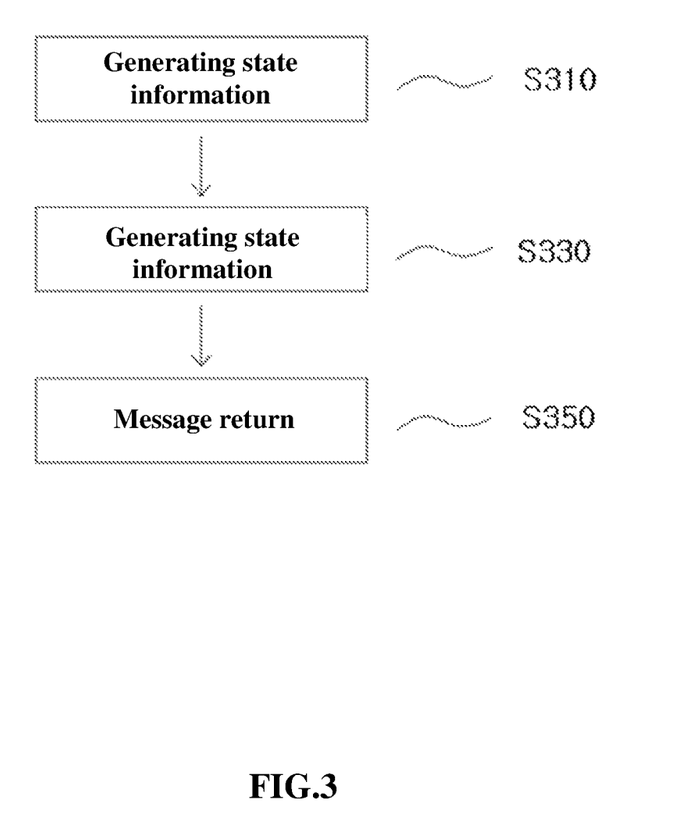

Drawing 3 is a flow chart illustrating a method according to this invention in terms of a terminal. Referring to Drawing 3, a first terminal measures the external magnetic force of the first terminal and the orientation of the first terminal, and generates state information data of the first terminal including information about the external magnetic force and the orientation Step S310; transmitting the state information data generated by the first terminal to a server (S330); and a step (S350) in which the first terminal receives a message from the server to confirm contact between the first terminal and the second terminal.

First, referring to Drawing 1, a server (110) can exchange data with two or more terminals (151 and 155). Generally, the server can exchange data with terminals through wireless communication, but it is not limited to wireless communication, and data may be exchanged through wired communication. In the present specification, a description of a technique relating to exchanging data is omitted.

When a terminal makes contact with each other with a predetermined purpose (for example, coupon exchange, game item exchange, attendance check, smart card bus card check, etc.) such as when the terminals exchange data with each other, information transmitted from terminals is received. The contact of the terminals among themselves is not limited to the case of exchanging data with each other, and both terminals may contact for any purpose. In the present specification, the term contact is not limited to a physical contact between two terminals, but includes a concept of a state in which two terminals are spaced apart by a predetermined distance, that is, a concept of proximity. Here, the distance may mean the distance between the magnetic fields between the two terminals.

When the first terminal comes into proximity with or contacts with the second terminal, the first terminal can measure the magnetic force output from the second terminal. For example, when the second smartphone accesses or contacts the first smartphone in which the smartphone application to which this invention is applied, the first smartphone can measure the magnetic force output from the second smartphone. As the second smartphone approaches or contacts the first smartphone, the external magnetic force measured by the first smartphone changes drastically. Thus, when the change of the external magnetic force is abrupt, the first smartphone can determine whether to proceed to the next step based on the change. In general, a smartphone capable of being a first terminal includes a speaker including a magnet or a motor for generating vibration, so that a high magnetic force is generated.

On the other hand, the magnetic force information includes any attribute information about the magnetic force in general physics such as magnitude and direction of the magnetic force. Also, the concept that the magnetic force is rapidly changed when the terminal measures the external magnetic force is included in the external magnetic force information. For example, the sudden increase in the external magnetic force and the weakening of the external magnetic force is a concept related to the change in the magnitude of the magnetic force, which is included in the external magnetic force information. Also, the fact that the direction of the magnetic force changes rapidly is also included in the external magnetic force information. In other words, the information on the external magnetic force includes the concept of changing the external magnetic force, and includes the magnitude or direction change of the magnetic force with respect to time. Similarly, the second terminal also measures the magnetic force output from the first terminal. Generally, as the distance between the terminals becomes closer, the strength of the external magnetic force measured by each terminal becomes stronger, so that each terminal can more easily measure the magnetic force. Also, in general, the first terminal measures the external magnetic force and the second terminal measures the external magnetic force simultaneously.

Thereafter, the first terminal may generate state information data of the first terminal including information on the external magnetic force measured by the first terminal and transmit the state information data to the server. However, the first terminal does not necessarily need to transmit all the information about the external magnetic force to the server, and may transmit arbitrary data based on the information about the measured external magnetic force. Also, when the first smartphone measures or detects that the external magnetic force is suddenly changed in connection with the previous example, the first smartphone may generate a flag, and may transmit the status information data to the server. That is, the measurement of the external magnetism of the first smartphone, such as a sudden change in the magnetic force, can be triggered to perform a series of steps after the first smartphone transmits data to the server, and it is not necessary to transmit direct information about external magnetic force such as size and direction to the server.

When the first state information data and the second state information data are received at the server, the server compares the time at which the first state information data and the second state information data are generated, respectively. Since the capability of generating the state information data by measuring the external magnetic force between the terminals differs, the difference between the times at which both data are generated is calculated in consideration of this, and if the first and second terminals are close to each other It can be determined that the first terminal measures the magnetic force rather than the magnetic force generated from the second terminal.

Also, the clocks in the first terminal and the second terminal may be used in synchronization. That is, the clock for measuring the time at which the status information data is generated operates in the same manner. The description related to the synchronization of the clock in the terminal is omitted herein.

Also, the server can calculate a difference between the first state information data and the time when the second state information data is received. Since the performance of measuring the external magnetic force between the terminals is different from each other and the route of communication through which the data is transferred from each terminal to the server differs from each other, the first state information data and the second state information. The time required for each of the data to be received by the server may be different. Therefore, when the difference is within the reference value, the server determines that the first terminal and the second terminal are attempting to contact each other. If the difference is not the reference value, the first terminal determines that the magnetic force generated from the second terminal, and it can be determined that the magnetic force is measured.

Also, in addition to the above description, the server can continuously receive variation values of the magnetic force measured by the first terminal and the second terminal from the first terminal and the second terminal. That is, in the above description, the magnetic force is measured at the terminal end, and when the magnitude of the magnetic force, particularly the magnetic force, exceeds the predetermined reference value, the terminal transmits the magnetic force information to the server at that time. On the contrary, in this invention, the magnitude of the magnetic force continuously received by the terminal is continuously sensed in the server terminal, and the magnitude of the magnitude of the magnetic force continuously received exceeds the reference value. That is, this invention can include both cases where the main body for determining that the magnitude of the magnetic force exceeds the reference value is the terminal and the case where the server is the main body. A main body for determining that the magnetic force has changed may be set in consideration of the communication environment, the terminal performance, and the server performance.

Also, the server may receive state information data of the terminal including orientation information indicating the directionality of the terminal. Orientation indicating the directionality of this invention may indicate directional information in a three-dimensional space, and any attribute value indicating the direction of the object may be used. When the first terminal and the second terminal are brought into proximity to or in contact with each other, the first terminal generates state information data including the orientation information of the first terminal and transmits the state information data to the server. Likewise, the second terminal also transmits the state information data including the orientation information of the second terminal to the server. The orientation of each terminal can be obtained through an optical gyro sensor, a MEMS gyro sensor, and the like, but is not limited thereto.

As described above, according to this invention, it is possible to clearly grasp whether or not the terminals are in contact with each other or not, using the time at which the status information data caused by the magnetic force change is generated and the orientation information.

Figure 4:
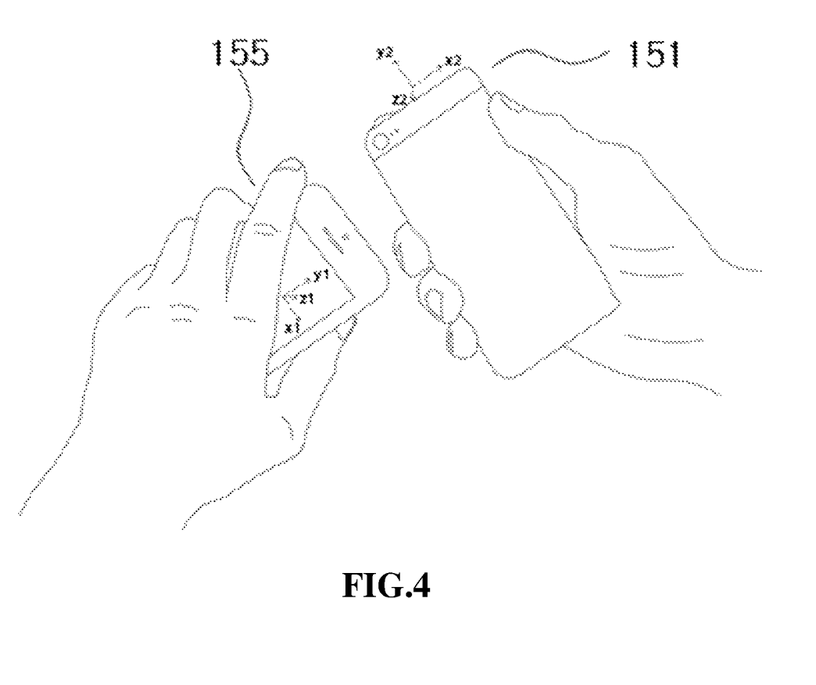

Drawing 4 is a diagram illustrating contact between terminals according to this invention. Referring to Drawing 4, when the first and second terminals are brought close to or in contact with each other, the orientation of the first terminal and the orientation of the second terminal are represented a pattern that is in a certain range or changes. In particular, it is general that a user who holds the terminal contacts the rear surface of his or her terminal to the rear surface of the terminal of another person. In this case, when at least one of the orientation of the first terminal and the orientation of the second terminal is contradictory or contradictory, the server may determine that the two terminals are in contact with or close to each other. Referring to Drawing 4, when users touch the terminal, the direction Z1 in which the rear face of the first terminal faces and the direction Z2 in which the back face of the second terminal faces are opposite or the same direction. The concept of the opposite or the same direction referred to in this specification is mathematically expressed in terms of both directional concepts of both terminals clearly differing by 180 degrees or 0 degrees as well as the fact that when placing the terminal in hand, including the concept of direction. That is, even if the directions of both terminals are different by about 179 to 181 degrees due to hand trembling between the persons holding the terminal, the direction of both terminals may be reversed in this case as well. The server can determine whether the two terminals are in contact with each other or not, considering a combination of orientations of the terminals.

Also, the server can receive the information of the orientation of the terminal at the time when the terminal transmits the state information data to the server, or the pattern of the change of the orientation of the terminal for a predetermined time before the point of time. That is, the state information data may include change information of the orientation that includes the time concept as well as the magnetic force change information including the time concept.

More specifically, referring to Drawing 4, a user can turn on the smartphone application to which this invention is applied, and transmit change information of the terminal orientation to the moment when the back sides of the terminals are contacted with each other to the server. In general, the user gazes at the front of the terminal on which the display is mounted, and the user can rotate the first terminal (151) by 180 degrees to establish communication. Apparently, the second terminal (155) can also be changed in a direction in which the orientation information can be in contact with the first terminal and the back surface at the same time. As described above, it is possible to more clearly determine whether or not the terminal attempts to communicate through the orientation change pattern of each terminal and the orientation matching between the terminals. Apparently, the magnetic force of the terminal is not necessarily limited to the order in which the orientation information is transmitted first and then measured.

On the other hand, the server can detect whether or not communication attempts between terminals are performed more accurately between terminals of different sizes by using the orientation information. Referring to Drawing 4, for example, when the backside contacts between a smartphone including a 3.5 inch display and a smartphone including a 4.7 inch display, or between a smartphone including a 3.5 inch display. The orientation of each smartphone is the same when it comes into contact. Therefore, in addition to using the magnetic force information, the server can more accurately measure the contact between the terminals. In addition to receiving the orientation information indicating the directionality of the terminal, the server may receive information on acceleration, such as acceleration magnitude and change, of the terminal instead of the orientation information.

Also, the server may receive state information data including position information of the terminal. More specifically, when the first terminal and the second terminal approach or contact each other, the first terminal transmits position information of the first terminal to the server. Likewise, the second terminal also transmits the location information of the second terminal to the server. The location information may be any type of information indicating the location of each terminal. For example, the location information may be GPS information of the terminal or location information of a radio station to which the terminal is connected. The location information in this specification includes not only information indicating the direct location of the terminal but also all concepts capable of relatively grasping the location of the terminal. For example, when the location of a terminal connected to the WiFi node is identified through location information of a WiFi node, in this case, the location information of the terminal is indirectly grasped. It can be determined that the degree of similarity is high when the difference of the measured distances between the two terminals is smaller than the predetermined distance.

A radio station may be identified by a medium access control address (MAC address), but is not limited thereto. Also, the radio station may include a general cellular radio tower, a WiFi node, a Bluetooth transceiver, and the like, and the radio station is not limited to the device. The server can receive the terminal position information at the time when the terminal measures the magnetic force and determines that the change in the external magnetic force is equal to or greater than the reference value. It is possible to more clearly determine whether or not the terminals are in contact with each other if it is determined that the positions of the two terminals transmitted from the two terminals through the position information are within a predetermined range.

Figure 5:
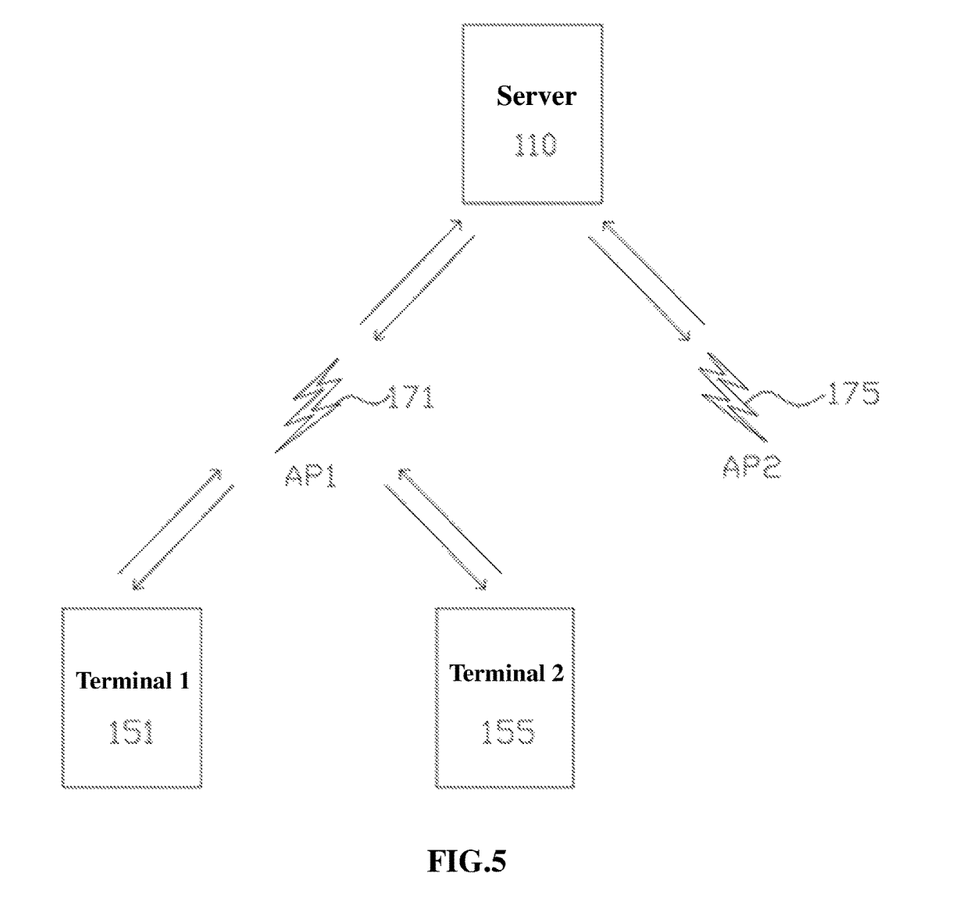

Drawing 5 is a diagram illustrating an example of using location information of a terminal. Referring to Drawing 5, when the MAC addresses of the radio station (171) transmitted from the two terminals (151 and 155) are the same, the server (110) determines that the two terminals are located in a range capable of wireless communication with the same radio station So that it is possible to determine whether the two terminals are in contact or close to each other more precisely. Also, it is possible to determine whether the two terminals are close by measuring the absolute distance between the two terminals by analyzing the GPS information of the terminal.

Also, the server may receive information of peripheral sounds of the terminal. More specifically, when the first terminal and the second terminal approach or contact with each other, data relating to the voice or sound around the first terminal can be transmitted to the server. Likewise, the second terminal also transmits data about the voice or sound of the surroundings of the second terminal to the server. The sound data may be data related to a peripheral sound of the terminal such as a voice or sound collected during a predetermined time before or after the time when the data on the magnetic force or the like is transmitted to the server or the time when the status information data is generated. For example, when a smartphone installed with a smartphone application to which this invention is applied operates the smartphone application, it is possible to use a smartphone from the time point when the external magnetic force of the smartphone suddenly changes. External voice or sound data of the phone can be collected and included in the status information data. Apparently, the interval during which voice or sound data is collected is not limited to the above point, but may be collected later than the point at which the external magnetic force change suddenly changes.

The server analyzes data on the voice or sound around the two terminals received from the two terminals and determines that the two terminals are positioned on a predetermined space when they are analyzed in the similar voice or sound. For example, when a user contacts his or her terminal with another terminal in a space such as a coffee shop, surrounding sounds such as music and conversation sounds input to the two terminals are the same or similar, the two terminals receive ambient sound, and transmit ambient sound information to the server. The similarity of the data regarding the voice or sound transmitted from the two terminals can be determined through various algorithms such as audio information retrieval, but is not limited thereto. Such a server can more precisely determine whether two terminals are in contact or proximity by determining the similarity of ambient sounds.

Also, the server can receive information such as the outside temperature of the terminal, the outside air pressure, and the like. More specifically, when the first terminal and the second terminal approach or contact each other, data relating to a temperature or an atmospheric pressure around the first terminal is transmitted to the server. Likewise, the second terminal also transmits to the server data about the ambient temperature or pressure of the second terminal. The data about the temperature or the atmospheric pressure may be data about the temperature or the atmospheric pressure before or after the time point at which the data about the magnetic force or the like is transmitted to the server or the respective status information data is generated. The server can determine the similarity of the temperature or the atmospheric pressure around the two terminals received from the two terminals, and determine whether the two terminals are in contact with each other. The determination of the temperature or the atmospheric pressure similarity between the two terminals may be performed to determine whether the similarity degree of the temperature or the atmospheric pressure is equal to or greater than the reference value and more specifically to determine whether the difference between the outside temperature or the atmospheric pressure of the two terminals is within a predetermined range is. For example, when a user tries to contact a terminal of another person to exchange a soccer card in a cold winter soccer stadium, the temperature and the atmospheric pressure measured by the two terminals are the same or similar, and the two terminals include the information on the atmospheric pressure in the respective state information data and transmit it to the server. If it is determined that the temperature or the atmospheric pressure is within the same similarity range, the server determines that there is a high possibility that the two terminals are equally positioned in a predetermined space, and the contact between the two terminals can be more clearly determined. For example, at the same time, a change in the external magnetic force is measured at two terminals simultaneously and each state information data is transmitted to the server. If the temperature in the first state information data is 10 degrees, the atmospheric pressure is 1,021 hPa, and if the second state data temperature is 33 degrees and the atmospheric pressure is 1,000 hPa, the server can determine that the two terminals are not in close proximity to each other.

The server transmits signals or data to each terminal for achieving a predetermined purpose when it is determined that the two terminals are in proximity to or contact with each other for a predetermined purpose. Accordingly, each terminal can achieve a predetermined purpose with respect to each other. For example, communication between terminals can be established. The form of the communication may be a network topology in which the first terminal is connected to the server and the second terminal is connected to the second terminal. Through the network topology, communication can be performed. Thus, each terminal can exchange various data such as music data, video data, image data, and the like, such as a business card, a coupon, and an electronic money. Also, this invention may be applied to a topology in which the first terminal is connected to the server and the second terminal is connected to the second terminal, and the terminal may receive the signal for communication between terminals, NFC function and Bluetooth function for direct communication or communication without turning on the communication function.

Figure 6:
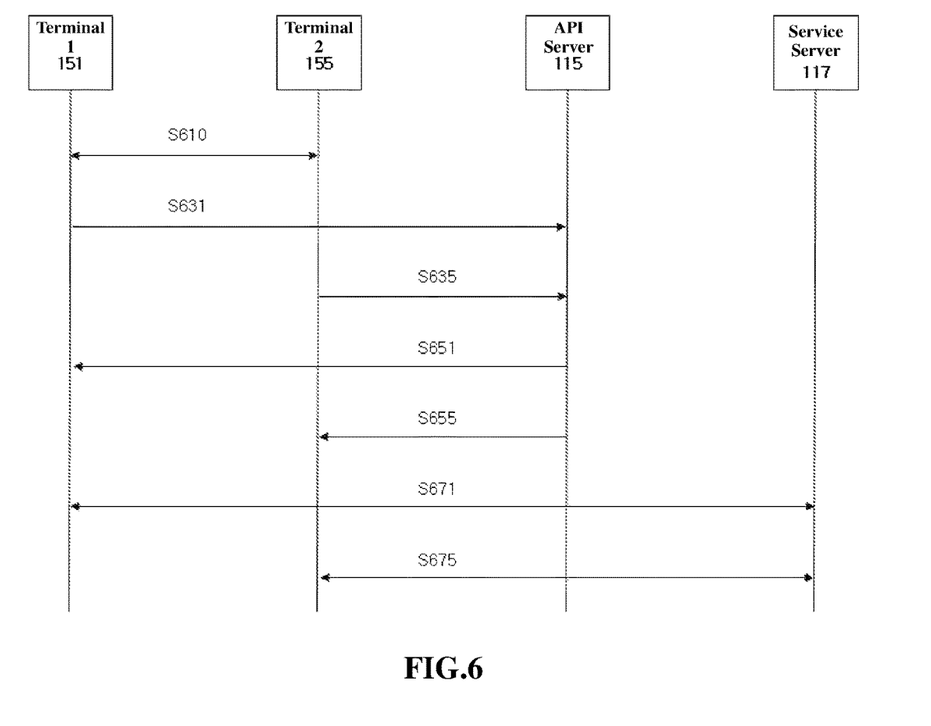

As an embodiment, through the server to which this invention is applied, it is possible to provide an API (Application Programming Interface) such that a plurality of smartphone applications or computer software use this invention. Drawing 6 is a diagram illustrating an operation between a smartphone application, an API server, and a service server using an API server to which this invention is applied. Referring to Drawing 6, the terminal 1 (151) physically approaches or contacts with the terminal 2 (155) for a predetermined purpose (S610). Then, the terminal 1 and the terminal 2 transmit data to the API server 110 in order to achieve a predetermined purpose (S631, S635). If the API server determines that the terminal 1 and the terminal 2 physically approach or contact each other for a predetermined purpose, the API server returns data including a success message to the terminal 1 and the terminal 2 (S671 and S675). Through the API server to which this invention is applied, it is possible to determine whether various smartphone applications are in contact with each other.

Figure 7:
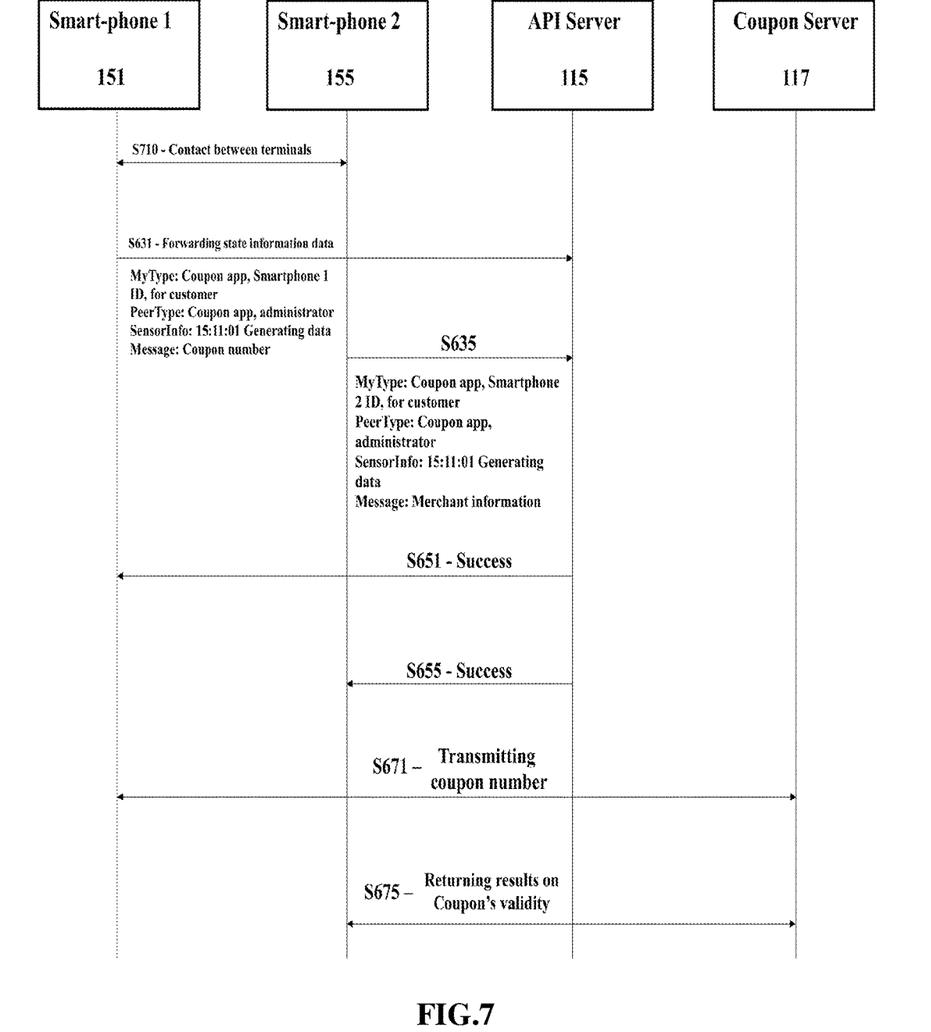

Drawing 7 is a diagram illustrating an application operation process of a smartphone for issuing a coupon to which this invention is applied. Referring to Drawing 7, an application related to coupon issuance is installed in each of the first smartphone (151) and the second smartphone (155). For example, assume that the first user of the first smartphone is the customer of the restaurant and the second user of the second smartphone is the operator of the restaurant. The first user turns on the coupon application on the smartphone and brings the mobile user's proximity to or contact with the smartphone of the second user who is the restaurant operator in order to use the mobile coupon that he has (S710). Thereafter, the coupon application of the first smartphone and the second smartphone detects the change of the external magnetic force by each smartphone close to each other, and each application transmits predetermined data to the API server (115) on this basis. The predetermined data may be an application identifier, an own terminal identifier, a counterpart terminal identifier, status information data, a message to be transmitted to the counterpart terminal, and the like. In this example, the smartphone can transmit data having parameters such as {MyType, PeerType, Sensor Info, Message} to the API server. For example, the first smartphone stores parameters such as 'coupon application, customer' as MyType, 'coupon application and operator' as PeerType. 'time when the change of magnetic field is detected. GPS position.' and the second smartphone can receive parameters such as 'coupon application, operator' as MyType, 'coupon application, customer' as PeerType, 'time when change of magnetic field is detected. GPS position,' which can be passed on to the server. The API server determines whether the first parameter MyType transmitted by the first smartphone and the fourth parameter PeerType transmitted by the second smartphone are identical to the third parameter MyType transmitted by the second smartphone and the MyType transmitted by the first smartphone. It is determined whether or not the second parameter PeerType is the same. As such, the MyType parameter contains the type of application querying the API server, so the API server can determine which application on the smartphone is querying. Also, the Sensor Info values are compared to determine if the smartphones have contacted at the same location. Thereafter, the API server delivers the result message to each of the first smartphone and the second smartphone, and the coupon application of the smartphone returns the message (S751, S755). The result message may be success indicating that the smartphone has made contact with each other at the same place, failure indicating that it has not been touched, or ambiguous that it has not been touched or contacted. As described above, various applications in the smartphone inquire whether the terminal of the smartphone has contacted the terminal of the other terminal of the API server, and the result is returned, thereby achieving the purpose of the application of the smartphone (S771, S775). For example, it is possible to exchange coupons or verify the validity period of a coupon through the service server (117) after it is confirmed whether or not the terminal is in contact with each other. Apparently, you can put various information in the Message parameter.

In another embodiment, the API server may transmit a message informing whether the first smartphone or the second smartphone is in contact with only one of the first smartphone and the second smartphone, with reference to the above embodiment. Because, according to the requirements of the mobile application using the API server, both the first smartphone and the second smartphone can be informed that the first smartphone and the second smartphone have been contacted, or only to the first smartphone, it can be notified only to the second smartphone. Alternatively, only the API server can recognize that the first smartphone and the second smartphone have contacted each other without notifying both the first smartphone and the second smartphone.

Also, the API server not only notifies the first smartphone or the second smartphone that the first smartphone and the second smartphone are in contact with each other, as well as a message that each smartphone transmits data to be transmitted to the server or the other smartphone; that is, payload can be transmitted together. Apparently, the contact confirmation message does not necessarily have to include a payload, and may include a payload depending on the requirements of the mobile application. For example, in the case of a mobile application that generates sound on both smartphones when they are simply touching each other, when the smartphones are in contact with each other, both smartphones merely receive a contact confirmation message If so, a preset sound can be generated. In this case, the payload to be specifically transmitted between both terminals may be unnecessary. On the other hand, in the case of a mobile application for exchanging business cards through contact between both terminals, a payload including specific information such as name, phone number, e-mail, as well as a contact confirmation message informing that both terminals must be transmitted.

Apparently, in this case, the payload does not necessarily have to be exchanged as described above, and the payload may be transmitted only from one smartphone to the other smartphone. For example, in an application that checks attendance via a smartphone contact in the classroom, the contact confirmation message may be exchanged when the student contacts her smartphone with the teacher's smartphone. In this case, along with the contact confirmation message, a contact confirmation message may be communicated from the student smartphone to the payload including information about the student via the API server to the teacher's smartphone. This allows the teacher to identify which student was present. In contrast, a student's smartphone simply receives a contact confirmation message from the server, thereby outputting a predetermined message on the smartphone of the student who has been successfully present.

That is, in this specification, a message is a concept including not only a contact confirmation message but also a contact confirmation message including a payload. Furthermore, it is needless to say that after the contact between smartphones is confirmed, a message including only the payload can be transmitted without including the contact confirmation message.

Figure 8:
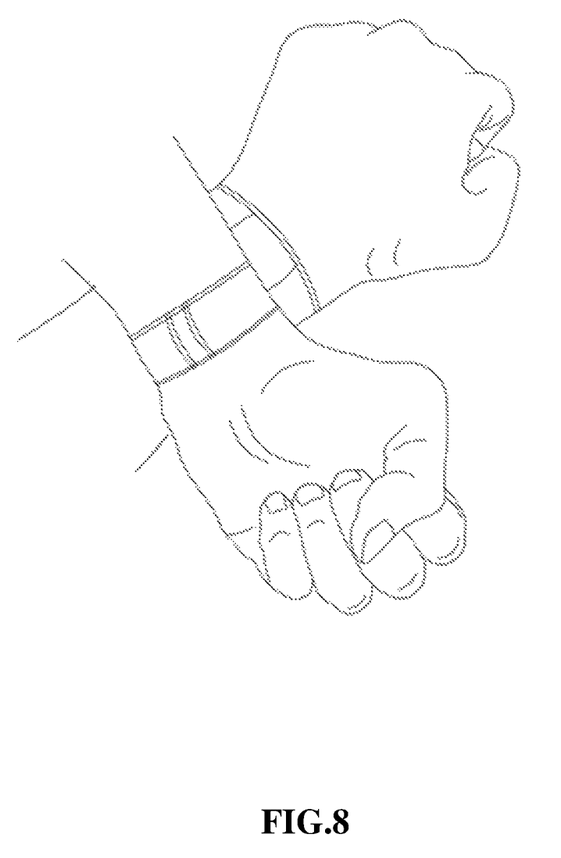

In another embodiment, there may be a smartwatch in which the application to which the invention is applied is installed. Drawing 8 is a diagram showing smartwatches (191 and 195) installed with applications to which this invention is applied. Referring to Drawing 8, in more detail, the smartphones are brought close to each other while users wear smartphones on their wrists to exchange data with each other. At this time, the application in the first smartwatch senses the magnetic force generated in the second smartwatch, and the second smartwatch also senses the magnetic force of the first smartwatch. Orientations of the first smartwatch and the second smartwatch, which occur when the first smartwatch and the second smartwatch come close to or in contact with each other on the body structure of the user, have directions opposite to each other in the three-dimensional space. Through this, the server can clearly determine that both smartwatches are trying to contact.

Establishing proximity or face-to-face communication among these smartwatches or driving an application can stimulate user's emotions compared to the general button operation of a terminal. In particular, by using a smartwatch equipped with an application to which this invention is applied, the user can perform various application operations by crossing the wrists. Through such an operation, it is possible to maximize the user's sensibility that cannot be felt in a general handheld type terminal rather than a wearable by automatically performing a function of adding a friend or recommendation to a social network service (SNS) to which the user is subscribed.

In another embodiment, in the case of a smartphone in which an application to which this invention is applied is activated, the application can be controlled so as to generate a stronger magnetic force than the general case so that the application can measure the magnetic force more easily. Furthermore, in the case of a terminal equipped with an electromagnet, when it is confirmed that the terminal is in contact with the server, the direction of the magnetic force generated by the electromagnets provided in the terminal is controlled in the same direction, whereby terminals repel each other to further increase the user's level of closeness. Also, in the case of an electromagnet, the magnetic force generated for each terminal can be changed, and utilized as means for identifying the terminal through such a change pattern.

As another embodiment, in the case of a smartphone having an application to which this invention is applied, the application may transmit magnetic force information generated in advance in a smartphone to the server, thereby enhancing the security of the contact determination. For example, it is assumed that the intensity of the magnetic force generated by the first smartphone is 150 micro-tesla at maximum, and the strength of the magnetic force generated by the second smartphone is at most 250 micro-tesla. At this time, each of the applications installed in the first smartphone and the second smartphone transmits to the server the intensity of the magnetic force generated in the first smartphone and the second smartphone in advance, and the server records the information. Then, when the first smartphone and the second smartphone attempt to contact each other, the first smartphone measures the magnetic force generated by the second smartphone and transmits the measured magnetic force to the server. Likewisely, the second smartphone transmits the measured magnetic force to the server. At this time, since the server stores the maximum magnetic force information that can be generated by the first smartphone and the second smartphone, when the intensity of the magnetic force of the other smartphone measured and transmitted by the first smartphone is 300 micro-tesla. It is possible to determine that the smartphone is not in contact with the second smartphone, thereby making it possible to clarify the candidates for the contact attempt and enhance the security.

In another embodiment, a terminal to which this invention is applied can vigorously vibrate the vibrating means such as an internal actuator to more specifically generate and measure state information. More specifically, the terminal can control not only the orientation information measurement but also the actuator provided therein, to vibrate according to the change of the measured external magnetic force, and to sense the controlled vibration from the counterpart terminal. Through this vibration, each terminal can detect acceleration change and include it in the status information data, so that it is possible to more clearly determine whether or not the terminals are in contact with each other. In particular, one of the terminals can control the actuator inside the terminal, and at the same time, the control signal indicating the inherent vibration pattern can be transmitted to the server so that the terminal has its own vibration pattern for identification. Also, the counterpart terminal can detect vibration from one of the terminals vibrating in the inherent vibration pattern, and can transmit the sensed vibration to the server. It is possible to confirm that both terminals are in contact with each other by comparing the control signal regarding the vibration pattern transmitted from the one terminal and the sensed vibration pattern received from the counterpart terminal. This can dramatically increase security.

In another embodiment, coupon issuance can be facilitated by using this invention. It is possible to facilitate issuance and use of a coupon or the like through a smartphone equipped with an application to which this invention is applied, without using a separate terminal such as an existing beacon terminal. For example, when a general customer tries to contact a smartphone installed with a coupon application for a customer to which this invention is applied and a coupon application for a service provider such as a cafe to which this invention is applied, they can exchange coupons wirelessly by establishing communication between phones. If both the customer and the service provider touch both terminals after turning on the coupon application to which this invention is applied, both terminals can be automatically authenticated for communication and coupons can be delivered to each other, so that an optical method such as an existing barcode scan It is possible to simplify the service procedure more dramatically. Also, even if the customer's terminal does not provide the NFC function, since the terminal can communicate with the terminal of the service provider via the server or through the Bluetooth communication, the service can be provided without being restricted by the type of the terminal. It is also apparent that the application to which this invention is applied can control the Bluetooth function of the smartphone. Also, this invention can be used for inviting a user to a multi-game.

The above-described methods and processes may be embodied as instructions for execution by, for example, a processor, controller, or other processing device, or may be encoded or read from a compact disc read only memory (CDROM), magnetic or optical disc, flash memory, (RAM) or read only memory (ROM), erasable programmable read only memory (EPROM), or other machine-readable medium.

Such a medium may be embodied as any device that stores, communicates, propagates, or moves executable instructions for use by or in connection with an instruction executable system, apparatus or device. Alternatively, or additionally, embodiment can come as analog or digital logic using hardware such as one or more integrated circuits, or one or more processor execution instructions; or as application programming interface (API) or dynamic link library (DLL), software of functions that are defined as local or remote procedure calls or are available in shared memory; or as a combination of hardware and software.

In other implementations, the method may be represented as a signal or a propagation-signal medium. For example, the instructions that implement the logic of any given program may take the form of electrical, magnetic, optical, electromagnetic, infrared or other types of signals. The above-described systems may be configured to receive such signals at a communication interface, such as a fiber optic interface, antenna, or other analog or digital signal interface, to recover instructions from the signal, store them in a machine-readable memory, and/or execute them.

As in the above, embodiments of this invention are described, however, it will be apparent to those knowledgeable about the applicable technology that annexations, alterations, deletions, or additions to components may be made without departing from the idea of the invention as provided in the appended claims, which may be included within the scope of the rights of this invention.

The invention claimed is:

1. A method for identifying contact between a first terminal and a second terminal, the method comprising:
   measuring, by the first terminal, first external magnetic force around the first terminal;
   measuring a position of the first terminal by using the first external magnetic force;
   generating first state data of the first terminal including the first external magnetic force and the position; and
   transmitting the first state data generated by the first terminal to a server,
   wherein the first terminal receives a message from the server to identify contact between the first terminal and the second terminal,
   wherein the first external magnetic force is generated by a terminal other than the first terminal, and
   wherein the step of measuring the position of the first terminal comprises measuring the position of the first terminal when a variation of the first external magnetic force around the first terminal measured by the first terminal per unit time is greater than a predetermined value or when the first external magnetic force is greater than a preset value.

2. The method according claim 1, wherein the step of measuring the position of e first terminal comprises controlling a vibrator disposed, in the first terminal; and
   measuring a vibration of an external terminal,
   wherein the first state data of the first terminal further includes acceleration information based on a vibration of the first external terminal measured by the first terminal.

3. The method according to claim 1, wherein the step of the transmitting the first state data generated by the first terminal to the server comprises transmitting, by the first terminal, a payload to the server.

4. The method according to claim 2, wherein the step of controlling the vibrator comprises checking a vibration pattern to identify the first terminal.

5. The method according to claim 1, wherein the step of the generating of the first state data by the first terminal comprises generating a first parameter that identifies the first terminal and a second parameter that identifies a second terminal that contacts the first terminal, and wherein the step of the transmitting the first state data to the server comprises transmitting the first parameter and the second parameter from which the first terminal is generated to the server.

6. A method for identifying contact between a first terminal and a second terminal, the method comprising:

measuring first external magnetic force around the first terminal and a position of the first terminal;

generating first state data of the first terminal including information based on the first external magnetic force and the position, wherein the first external magnetic force is generated by a terminal other than the first terminal;

transmitting the first state data generated by the first terminal to a server;

verifying whether a first variation of the first external magnetic force of the first terminal per unit time is greater than a first predetermined value or whether the first external magnetic force is greater than a first preset value; and receiving, by the first terminal, a message from the server to identify contact between the first terminal and the second terminal.

7. The method according to claim 6, wherein the step of the generating of the first state data by the first terminal comprises generating, by the first terminal, the first state data when the first variation of the first external magnetic force around the first terminal measured by the first terminal is greater than the first preset value or when the first external magnetic force is greater than the first predetermined value.

* * * * *